Figure 1:
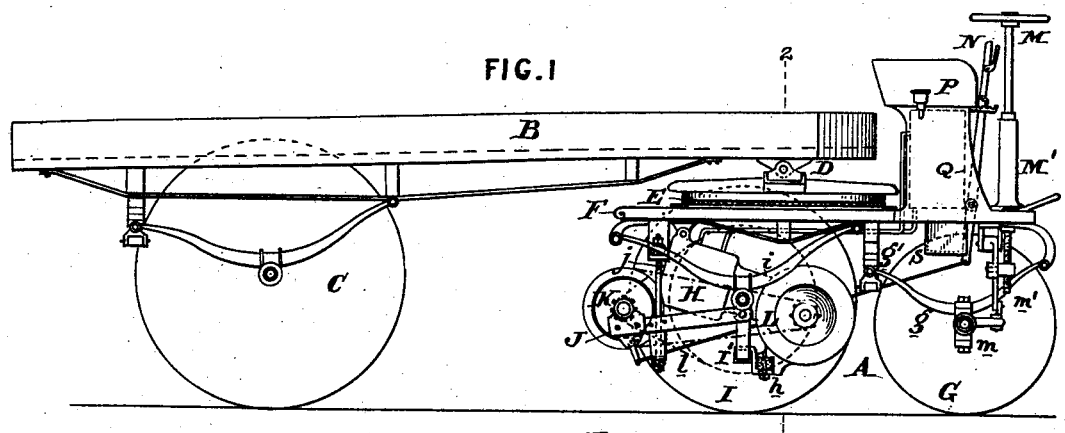

No. 696,143. Patented Mar. 25, 1902.
R. M. HUNTER.
MOTOR VEHICLE.
(Application filed Mar. 11, 1901.)
(No Model.)

Attest
R. M. Tilly.
Robt. M. Hunter

Inventor

THE NORRIS PETERS CO., PHOTO-LITHO., WASHINGTON, D. C.

UNITED STATES PATENT OFFICE.

RUDOLPH M. HUNTER, OF PHILADELPHIA, PENNSYLVANIA, ASSIGNOR TO THE TRACTOR TRUCK AND GENERAL POWER CO., A CORPORATION OF NEW JERSEY.

MOTOR-VEHICLE.

SPECIFICATION forming part of Letters Patent No. 696,143, dated March 25, 1902.

Application filed March 11, 1901. Serial No. 50,627. (No model.)

*To all whom it may concern:*

Be it known that I, RUDOLPH M. HUNTER, of the city and county of Philadelphia and State of Pennsylvania, have invented an Improvement in Motor-Vehicles, of which the following is a specification.

My invention has reference to motor-vehicles; and it consists of certain improvements which are fully set forth in the following specification and shown in the accompanying drawings, which form a part thereof.

This invention, Case No. 313, is especially directed to heavy wagon or truck work designed to handle large loads, but may be applied, if desired, to lighter types of vehicles.

The object of my invention is to provide a construction of motor-vehicle in which the motive element is independently movable relatively to the load-carrying or body portion. In this manner I am enabled to concentrate the entire motive mechanism into a compact strong truck structure having within itself the capacity of propulsion and steering and adapted to perform the function of a mechanical horse and pull a load-carrying or trailing body portion which is supported at the rear on wheels and pivoted at the front to the self-propelled tractor-truck. The combination of an independent self-propelled and steerable self-supporting truck with the rear trailing load-carrying body gives the greatest capacity for being easily, accurately, and quickly steered, as well as capability of being turned in the smallest possible area or width of street.

In construction my invention comprehends, as above pointed out, a self-supporting and steerable tractor-truck containing within itself the motive power and combined with a body portion supported at the rear upon wheels and pivoted at the front to the said tractor-truck, preferably back of the operator's seat, by a special pivoted connection. The pivot connection comprehends a fifth-wheel structure between the truck and body with a transverse hinge or pivot-axis between one member of the fifth-wheel and one member of the wagon proper, the illustration showing it between the fifth-wheel and wagon-body. By this construction the truck on its supporting-wheel base may rock fore and aft to compensate for irregularities or obstructions in the road-bed without placing excessive strains upon the fifth-wheel or the king-bolt. It enables the truck to have six supporting-wheels without creating any difficulty in keeping all six wheels at all times in proper operative relation with the ground. The employment of the six wheels gives more stability to the wagon and greater opportunity for the satisfactory application of power on the tractive principle.

The tractor-truck more specifically comprehends an upper truck-frame supporting the fifth-wheel or pivot for the body, and in front of it the operator's seat and controlling and steering mechanism, so that it is a self-contained small motor-vehicle or tractor-truck complete in all particulars except that it has no body portion or capacity for storing a load of merchandise. By placing the operator's seat upon the truck in place of on the wagon-body, as heretofore, great advantage arises in handling the vehicle as a whole. It enables the operator to always be in proper relation to the controlling devices on the truck and obviates all loose or jointed swiveling connections through the fifth-wheel. The axles are connected to the truck-frame by springs, and these springs, which connect the main or propelling wheels, are connected directly between the axle and truck-frame at the rear of the axle to act as ties, since the pull upon the truck comes through these springs, causing them to act as links or ties and subjected to tensile as distinguished from compressive or crushing strains; but the springs which support the steering-wheels are connected in the reverse way—namely, positively at the forward end and preferably connected at their rear ends with a transverse semi-elliptical spring. This properly disposes the springs to handle the normal strains exerted in pulling the load. The propelling-wheels may be the forward wheels or the rear wheels of the truck, as desired; but in either case the fifth-wheel should be located nearer the axle of the driving-wheels than that of the steering-wheels, so as to cause the load to come more largely upon the driving-wheels. By this distribution of the load only sufficient weight is allowed to come upon the steering-wheels to insure good and positive steering without introducing excessive labor upon the operator even in the heaviest vehicle when loaded to the fullest capacity.

My invention also comprehends details of construction and will be better understood by reference to the drawings, in which—

Figure 2:
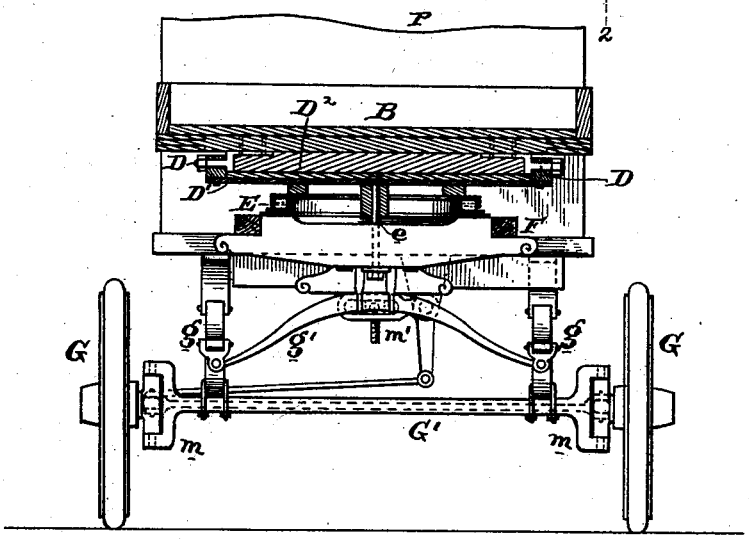
Figure 3:
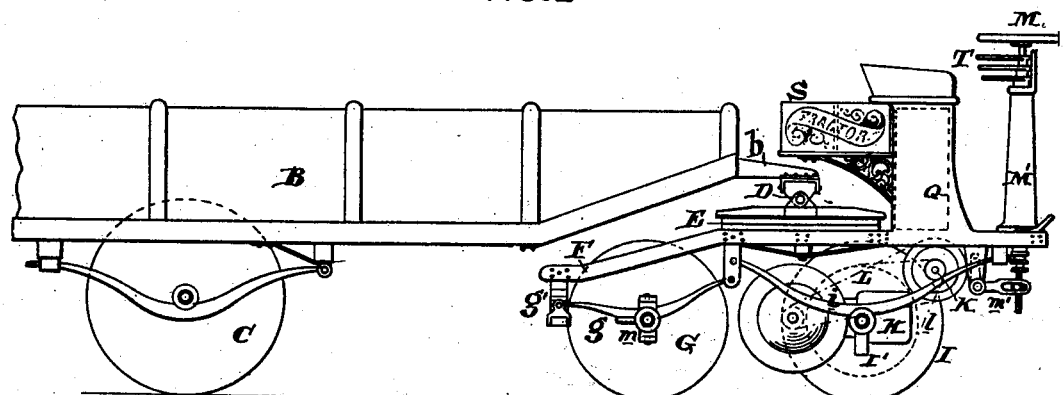

Figure 1 is a side elevation of a motor-vehicle embodying my invention, with the wheels on the near side removed. Fig. 2 is a cross-section of same on line 2 2; and Fig. 3 is a side elevation, similar to Fig. 1, showing a modification of my invention.

A is the tractor-truck and carries upon it at E the fifth-wheel, which is preferably of the antifriction type, first, because it reduces the friction against turning under heavy load, and, second, because a fifth-wheel of this character centers the body of the vehicle upon the truck and only puts upon the king-bolt $e$ the duty of holding the two parts together. The upper member of this fifth-wheel is provided with a transverse channel-beam D', having a wooden rocker-bed formed in it. It also has at its ends the two bearings in which the transverse journal-bolts D rock. These journal-bolts D are secured to the under portion of the body B of the wagon. The space on the bottom of the wagon-body between the journal-bolts D is filled in with a rocker of wood $D^2$, adapted to fit the bed in the channel-iron. In this manner the wagon-body B is transversely hinged to the top member of the fifth-wheel, and the downward thrust is distributed over the entire width of the fifth-wheel. Both this transverse hinge and the fifth-wheel may be modified as to details without departing from the essence of the invention. The object of this construction is to secure all of the well-known advantages of the fifth-wheel and enables the tractor-truck to rock fore and aft under the wagon-body, or vice versa, because while not a full universal joint it secures the necessary adjusting capacity in the direction of the length of the six-wheel base and yet maintains the lateral stability or support of the body on the fifth-wheel. The body B is pivoted to the fifth-wheel close to its extreme forward end and is extended rearward to any length desired and supported on the usual rear supporting-wheels C and spring-gear. By location of the wheels C any degree or proportion of the load may be caused to act upon the pivoted or tractor truck, and by the proper location of the fifth-wheel over the driving-wheels of the truck any desired degree of traction may be secured.

The tractor-truck A has its upper frame F provided at the front with the footboard and operator's seat P, the latter being arranged immediately in front of the fifth-wheel E. In this manner the seat P and footboard are wholly independent of the wagon-body, and in steering or turning the truck under the body the controlling-handles or hand-wheels are not displaced relatively to the seat and position occupied by the operator, which is important in steering very large and heavy wagons. The driving-wheels I are journaled on the axle I' and said axle connected with the truck-frame F by side springs $i$, said springs being positively hinged at their rear ends to the truck-frame.

G represents the forward or steering wheels and are carried upon the axle G' by the usual knuckle-joints $m$, whereby said wheels may be turned for steering under the manipulation of the hand steering-wheel and shaft M and connecting lever mechanism $m'$ between the same and the knuckle-joints in any of the well-known manners. The steering-shaft of the hand-wheel M is journaled in an upright standard M', carried on the footboard of the truck. The steering-axle G' is connected to the truck-frame F by a system of side springs $g$ and cross-spring $g'$, similar to those usually in use on the truck of wagons, with the side springs connected at their forward ends with the truck-frame in a firm manner, being the reverse of the connection desirable for the springs of the motive or propelling wheels. This is to meet the fact that the propelling-wheels tend to pull the springs forward, while the steering-wheels tend to pull the springs backward.

H is the motor, shown, for example, as a gasolene-motor of the explosive type. It is hinged to the axle I' at $h$ and at the other end is hung from the truck-frame, so as to be spring-supported.

J is a frame hinged to the axle and hung at its free end by bolts and rubber cushions $j$ from the truck-frame F. This frame J carries the intermediate or transmission shaft K, upon which is the transmission-gear, including the variable forward speed, the reverse, and the compensating gears. This shaft is driven from the engine by sprocket-chain L and in turn drives the driving-wheels I by the sprocket chains and gears $l$. In this manner the high speed of the engine may be greatly reduced in the driven main wheels I with equivalent increase of power. The motor is kept cool by water in tank Q under the operator's seat P, and the gasolene is supplied from a tank S under the truck-frame.

N is the controlling-lever devices leading to the variable-speed gear and shaft K for controlling it, and as all of these are on the pivoted truck and move as a unit no difficulty is experienced in making the adjustments or maintaining them under the swiveling action of the truck.

In the construction shown in Fig. 3 the general appearance of the wagon is somewhat different from that of Fig. 1, but the construction is the same in all material particulars. In this case, however, the relative positions of the driving-wheels I and steering-wheels G have been reversed, the former being in front in this case, whereas they are in the rear in Fig. 1. The gasolene-tank S and tool-box are in this case placed at the rear of the seat P and extended over the fifth-wheel; but this is only a minor detail, it being permitted owing to the fact that the wagon-body is supported on the fifth-wheel through an iron extension b. The running-gear is, in effect, turned end for end under the truck-frame in Fig. 3, as compared with Fig. 1; but this is not material and only goes to the design.

T represents the controlling-levers for the variable-transmission gears and are shown as being journaled in the standard M' of the steering-shaft of the hand-wheel M.

It will be observed that the fifth-wheels are located much more nearly over the drive-wheel axles than the steering-wheel axle, and this is as it should be for the reason that it is desirable to put all the load upon the wheels I possible for traction purposes and as little load on the steering-wheels as is consistent with good steering, for reasons already stated.

If desired, all of the wheels of the tractor-truck may be rubber-tired, though in practice I have not always used rubber tires on the traction-wheels I; but prefer always to use solid rubber tires on the steering-wheels G to prevent slipping laterally under the possibility of heavy transverse strains in view of the small wheel-base of the truck.

In place of a gasolene-engine steam, electricity, compressed air, or other motive power may be employed, as may be desired. While I have shown the use of steering-wheels on knuckle-joints and in alinement with the propelling-wheels of the tractor-truck, I do not limit myself thereto, as said wheels may be supported upon a rear vertical steering-shaft and close together, if desired, as shown in my application for Letters Patent, Serial No. 44,695, filed January 25, 1901.

In carrying out my invention it will be observed that I embody the generally established principles of construction of commercial wagons as far as possible, as these have stood the test of time as to durability and are simpler and cheaper of construction than those usually employed in the more modern automobile construction, where extreme lightness in weight is aimed at.

While I prefer the constructions herein shown and described as being excellently adapted to the purpose of my invention, I do not limit myself to the details thereof, as they may be varied or modified without departing from the spirit of the invention.

Having now described my invention, what I claim as new, and desire to secure by Letters Patent, is—

1. In a motor-vehicle, a tractor-truck consisting of driving and steering wheels and axles therefor, a long truck-frame supported at a distance above the axles, springs supporting said truck-frame upon all of the wheels and axles, and motive-power devices for rotating the driving-wheels carried by the tractor-truck, in combination with a vehicle-body portion supported at the rear on wheels, and a mechanical connection between the forward part of the vehicle-body and spring-supported truck-frame consisting of a fifth-wheel and a transversely-jointed member hinged upon the fifth-wheel.

2. In a motor-vehicle, the combination of a self-supporting and driven tractor-truck having a spring-supported frame carrying an operator's seat at its forward part and a fifth-wheel at the rear of the seat, with a vehicle-body portion supported at the rear on wheels and having its forward body part provided with a transverse rocking hinge jointed to the fifth-wheel of the truck whereby the truck may rock fore and aft under the body portion and the operator's seat move as a unit with the truck and independently of the body portion.

3. In a motor-vehicle a self-supporting and driven tractor-truck comprising a truck-frame, propelling and steering wheels, axles for said wheels connected to the truck-frame by springs, a motor to rotate the propelling-wheels, an operator's seat on the truck-frame and means on the truck for controlling the steering-wheels and motor, the whole moving as a unit, in combination with a vehicle-body supported on wheels at its rear portion, and a fifth-wheel connection between the forward end of the body and truck at the rear of the operator's seat, one member of the fifth-wheel being fastened to the truck-frame and the other member attached to the vehicle-body.

4. In a motor-vehicle, a tractor-truck of small size relatively to the vehicle and comprising a truck-frame, propelling and steering wheels and their axles, springs supporting the truck-frame upon the axles, an operator's seat in advance of the propelling-wheels and means on the truck for controlling the steering-wheels and motor in advance of the seat, the whole moving as a unit, in combination with a vehicle-body supported on wheels at its rear portion, and a fifth-wheel connection between the forward end of the body and the truck-frame of the tractor-truck immediately at the rear of the operator's seat the said fifth-wheel connection being between the propelling and steering wheels and much closer to a vertical plane through the propelling-wheels than through the steering-wheels whereby the greater weight of the load may be placed upon the propelling-wheels to secure the traction required and light load upon the steering-wheels to permit them to be easily adjusted.

5. In a motor-vehicle, the combination of a vehicle-body with two forward pairs and one rear pair of wheels of same gage the latter being connected with the rear of the vehicle-body, means for connecting the two forward pairs of wheels into a small-wheel base-truck and providing a spring-supported truck-frame, universal pivot connections between the vehicle-body and spring-supported truck-frame much closer to the axle of the propelling-wheels than the axle of the steering-wheels, power devices for rotating one pair of the wheels of the truck to propel the vehicle suspended below and from the truck-frame so as to allow the vehicle-body to come close to the truck-frame, and steering devices for adjusting the other pair of truck-wheels carried by said truck at its front part.

6. In a self-supported and steerable tractor-truck for a motor-vehicle, the combination of spring-supported truck-frame provided with an operator's seat at the front, a fifth-wheel adapted for supporting a vehicle-body immediately at the rear of the seat, propelling-wheels arranged near the fifth-wheel, and a motor on the truck sustained by and below the spring-supported truck-frame for propelling it and mechanically connected to rotate the propelling-wheels.

7. In a motor-vehicle, a truck having axles and wheels to propel it and axles and wheels to steer it, side springs connecting the propelling-wheel axle directly with the truck-frame at the rear of the axle to act as ties whereby the axle directly pulls the truck-frame, springs connecting the steering-wheel axle with the truck-frame forward of the axle to act as drag-bars to pull the axle by the propelled truck-frame, power devices to rotate the propelling-wheels, and means for adjusting the steering-wheels independently of the axle, in combination with a vehicle-body supported on rear wheels and pivoted at its forward end to the truck.

8. In a motor-vehicle, a frame carrying the seat, axle and wheels for propelling the vehicle, axle and wheels for steering the vehicle, side springs $i$ for the axle of the propelling-wheels and connected at front and rear ends with the vehicle-frame and said connection at the rear being positive, side springs $g$ connecting at their forward ends positively with the vehicle-frame and secured at their middle portions with the axles for the steering-wheels, a cross-spring $g'$ connecting the rear ends of the springs $g$ and connected at its middle to the vehicle-frame, means to adjust the steering-wheels, and power devices for rotating the propelling-wheels.

9. In a motor-vehicle, a self-supporting driven and steerable truck having a spring-supported truck-frame, in combination with a vehicle-body supported on wheels at the rear, and a hinge connection between the forward part of the vehicle-body and the truck-frame consisting of a large circular fifth-wheel and a transversely-arranged rocker-frame hinged to one member of the fifth-wheel.

10. A self-supporting and steerable truck for a motor-vehicle having a spring-supported frame provided with an operator's seat at the front, a fifth-wheel, and a transverse hinged support carried by the fifth-wheel for supporting a vehicle-body immediately at the rear of the seat and between the axles of the truck.

11. In a motor-vehicle an adjustable connection between the truck and body consisting of a fifth-wheel comprising two members pivoted together by a king-bolt, combined with a transverse hinge also comprising two members of much greater length than the diameter of the fifth-wheel one of which is secured firmly to one member of the fifth-wheel and the other acting as a transverse bolster for the vehicle-body, the remaining member of the fifth-wheel being adapted for connection with the truck structure.

12. In a motor-vehicle the combination of the vehicle-frame, a fixed axle connected to the vehicle-frame by springs, wheels loosely journaled on the axle, a frame J pivoted to the axle and suspended from the vehicle-frame at its free end, the transmission-shaft and controlling-gear K journaled in said frame J and connected with the wheels by chain-gearing, a motor supported by the vehicle, and chain-gearing between the motor and transmission-gear.

13. A self-supporting and steerable truck having a spring-supported truck-frame provided with an operator's seat at the front, combined with a vehicle-body supported on wheels at the rear, and a positive universal jointed connection between the front of the vehicle-body and the spring-supported truck-frame at the rear of the seat.

14. In a motor-vehicle, a spring-supported frame carried on driving axle and wheels, combined with a counter or transmission shaft supported by arms hinged to the axle to hold it at a given distance and permit vertical motion, suspension-rods for sustaining the counter or transmission shaft from the spring-supported frame so that it rises and falls with said frame, power-transmitting connections between the counter or transmission shaft and the driving-wheels, a motor located to one side of the counter or transmission shaft, and sprocket and chain gearing between the motor and counter or transmission shaft.

In testimony of which invention I have hereunto set my hand.

R. M. HUNTER.

Witnesses:
R. M. KELLY,
J. W. KENWORTHY.